(12) United States Patent
Charles et al.

(10) Patent No.: US 11,530,767 B2
(45) Date of Patent: Dec. 20, 2022

(54) TOOL-LESS JOINER CLAMP

(71) Applicant: L3Harris Technologies, Inc., Melbourne, FL (US)

(72) Inventors: David F. Charles, Arlington, VA (US); Douglas L. Veilleux, II, Rochester, MA (US); Corey S. Toupin, Fall River, MA (US); Daryl B. Slocum, La Mesa, CA (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 216 days.

(21) Appl. No.: 16/877,014

(22) Filed: May 18, 2020

(65) Prior Publication Data

US 2021/0018130 A1    Jan. 21, 2021

Related U.S. Application Data (60) Provisional application No. 62/875,428, filed on Jul. 17, 2019.

(51) Int. Cl.
   *F16L 37/18*     (2006.01)
   *F16B 2/10*      (2006.01)

(52) U.S. Cl.
   CPC .............. *F16L 37/18* (2013.01); *F16B 2/10* (2013.01)

(58) Field of Classification Search
   CPC . F16L 33/12; F16L 33/22; F16L 33/28; Y10T 24/1424; F16B 2/10; F42B 19/005; F42B 15/36; B63G 2008/002
   USPC ............................................... 114/22
   See application file for complete search history.

(56) References Cited

U.S. PATENT DOCUMENTS

| | | | | |
|---|---|---|---|---|
| 667,808 | A * | 2/1901 | Tackaberry | F16L 33/12 285/387 |
| 6,403,873 | B1 * | 6/2002 | Amaral | F42B 19/005 114/22 |
| 2001/0009634 | A1 * | 7/2001 | Giesenberg | F42B 15/36 403/338 |

* cited by examiner

*Primary Examiner* — Robert Sandy
(74) *Attorney, Agent, or Firm* — Workman Nydegger (57) ABSTRACT

A tool-less joiner clamp includes a hinged circular body having a forward mating flange and an aft mating flange configured to selectively attach to a forward section flange and an aft section flange of an underwater vehicle, respectively. The forward mating flange has a threaded inner diameter configured to integrate with a threaded outer diameter of the forward section flange, such that rotating the joiner clamp about the forward section flange causes the clamp to move in an axial direction. Also included is a cam lock for selectively closing and tightening the tool-less joiner clamp onto the forward and aft section flanges of the vehicle and may include a quick release mechanism for opening the cam lock. The clamp may also include collapsible handles, and multiple buttons configured to press against a flat surface of the aft mating flange when the joiner clamp is rotated about the forward section flange.

19 Claims, 7 Drawing Sheets

TOOL-LESS JOINER CLAMP

CROSS-REFERENCE TO RELATED APPLICATIONS

This application claims the benefit of and priority to U.S. Provisional Patent Application Ser. No. 62/875,428 filed on Jul. 17, 2019 and entitled "TOOL-LESS JOINER CLAMP," which application is expressly incorporated herein by reference in its entirety.

BACKGROUND

Unmanned Undersea Vehicles (UUVs) are frequently created and assembled in various sub-sections. Manufacturers or assemblers typically assembly the sub-sections at deployment using a wide range of tools and apparatus in order to ensure proper alignment, fit, and to ensure a water-tight seal. The size and weight of the components can complicate such fittings.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments illustrated herein provide a tool-less joiner clamp, including related systems components, and methods, for joining two sections or modules of a UUV without the use of additional apparatus or tools. In one implementation, for example, the tool-less joiner clamp is configured to engage at least one edge of a forward section assembly, and to engage an aft section assembly on the opposing edge of the clamp. A manufacturer can then use the tool-less joiner clamp to draw the two sections together and form a secure, water-tight seal, without the use of additional tooling. In at least one embodiment, the tool-less joiner clamp provides a water-tight seal to a UUV weighing between 200 and 300 pounds while operating at depths as low as approximately 1000 feet below the surface of a body of water, and without risk of separation or leakage between the bow and UUV modular component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments illustrated herein are directed to components that can be used in an Unmanned Undersea Vehicle (UUV). These vehicles can be used to carry payloads and software packages to detect, classify, localize, identify, and/or retrieve targets. In some embodiments, such vehicles are designed to weigh less than 240 pounds, operate at approximately 1000 feet below the surface of a body of water, and measure less than 99 inches in length and 9 inches in diameter. Indeed, in some embodiments, such vehicles may be configured to be used in torpedo tubes of various watercraft. Embodiments illustrated herein may include components that help to meet certain corrosion resistance requirements. Alternatively or additionally, embodiments may include components configured to meet certain buoyancy requirements.

In some embodiments, a tool-less joiner clamp for joining two sections of a UUV or similar apparatus is disclosed. In some embodiments, the tool-less joiner clamp comprises a hinged circular body having a forward mating flange and an aft mating flange configured to selectively attach to a forward section flange and an aft section flange of an underwater vehicle, respectively. The forward mating flange has a threaded inner diameter configured to integrate with a threaded outer diameter of the forward section flange, such that rotating the joiner clamp about the forward section flange causes the clamp to move in an axial direction.

In at least one embodiment, a cam lock is included for selectively closing and tightening the tool-less joiner clamp onto the forward and aft section flanges of the vehicle and may include a quick release mechanism for opening the cam lock. The tool-less joiner clamp may also include collapsible handles to provide a user with gripping means when rotating the clamp onto or off of the forward section flange. In at least one embodiment, the handles are flush with an outer diameter of the tool-less joiner clamp when in the closed position, and may include a spring mechanism for quickly deploying the handles for use.

In at least one embodiment, multiple buttons attached to a flat surface of the aft mating flange are configured to press against a flat surface of the aft mating flange when the joiner clamp is rotated about the forward section flange to prevent marring of the respective flat surfaces. In at least one embodiment, a foam component can be inserted into a cavity between the two sections prior to joining said sections using a tool-less joiner clamp. The foam component can provide additional buoyancy to the joined vehicle and effectively increase the internal pressure between the two joined sections when they are pulled together by the tool-less joiner clamp, by filling dead air space with the foam component, which is non (or minimally) compressible.

Embodiments illustrated herein may include components that help to meet certain corrosion resistance requirements. Alternatively or additionally, embodiments may include components configured to meet certain buoyancy requirements.

Figure 1:
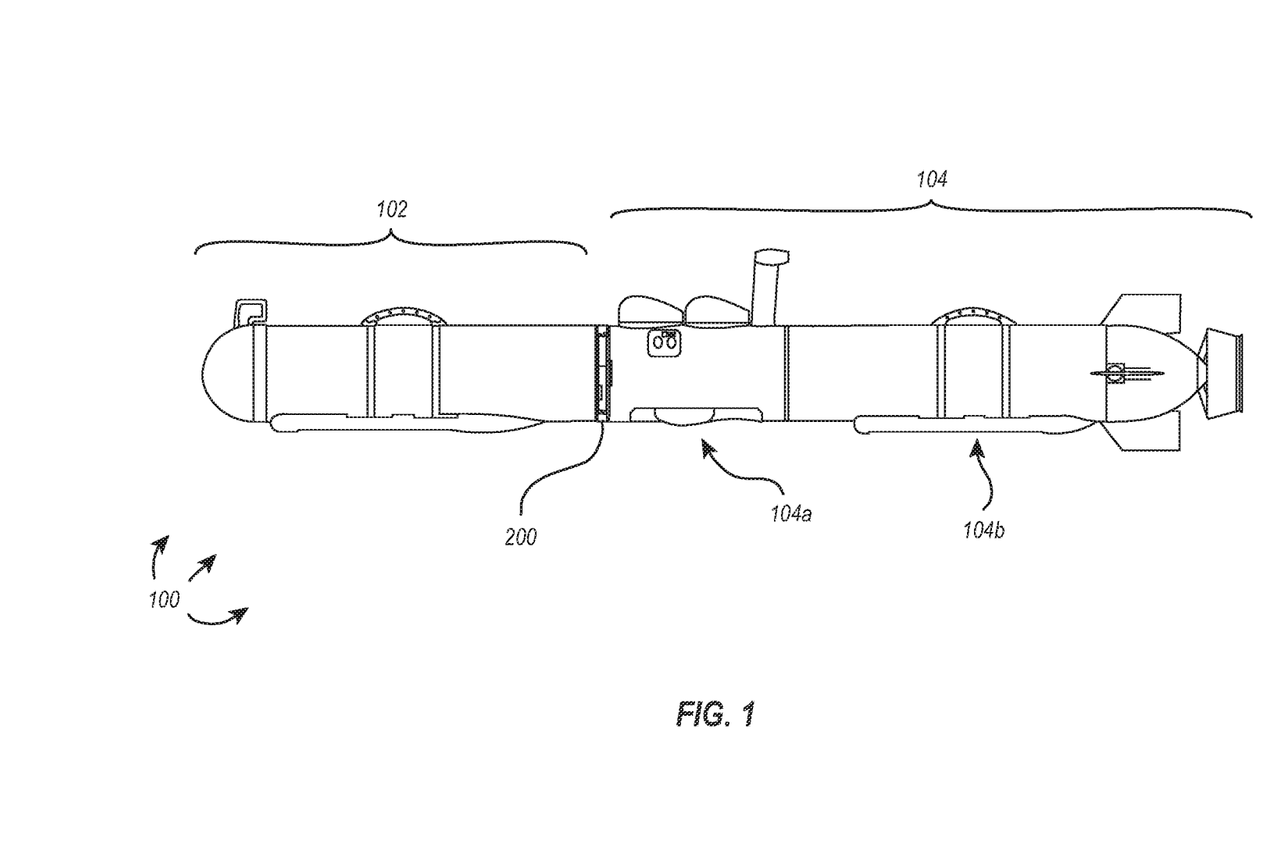
FIG. 1 illustrates a perspective view of an exemplary Unmanned Undersea Vehicle (UUV) system with at least two sections being secured to each other by a tool-less joiner clamp.

Turning now to the Figures, FIG. 1 illustrates an exemplary Unmanned Undersea Vehicle (UUV) 100 with multiple modular sections, two of which are secured to each other by a tool-less joiner clamp 200 in accordance with the present disclosure. The illustrated UUV comprises a forward section 102 having a cylindrical battery module with a nose cone covering its bow. The illustrated UUV also comprises an aft section having multiple modules (e.g., 104a, 104b). As illustrated, the forward section 102 and the aft section 104 are secured axially by clamp 200. Other modules shown can be secured by collars that require additional time and tooling. By utilizing a tool-less joiner clamp as disclosed herein, two joined sections (e.g., 102, 104) can quickly be disjoined and serviced or swapped for replacement or alternative sections by a user without the use of tools.

Figure 2:
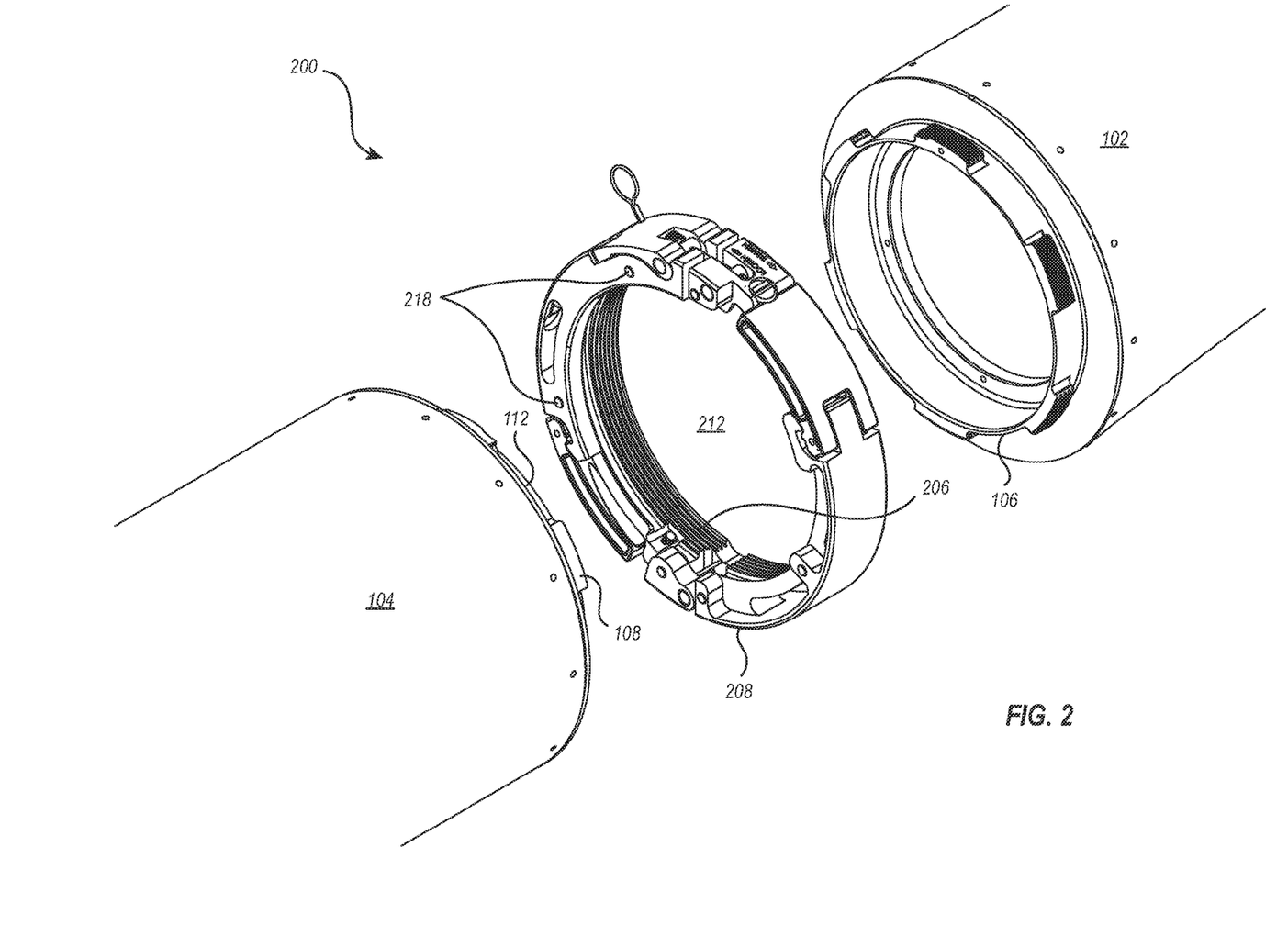
FIG. 2 illustrates a perspective view of an exemplary tool-less joiner clamp in association with two corresponding sections of a UUV.

FIG. 2 illustrates a tool-less joiner clamp 200. FIG. 2 shows that the tool-less joiner clamp 200 can be configured to join a forward section 102 and an aft section 104 of the vehicle 100 (see FIG. 1). In the illustrated embodiment, the tool-less joiner clamp 200 includes an aft mating flange 208 configured to mate with an aft section flange 108 on the aft section 104 of the vehicle 100. FIG. 2 further shows that a tool-less joiner clamp 200 further can comprise a forward mating flange 206 configured to mate with a forward section flange 106 on the forward section 102 of the vehicle 100. Also shown are multiple buttons 218 integrated into a flat section of the aft mating flange 208. The composition and intended purpose of the buttons 218 are described in detail below in relation to FIGS. 4 through 6.

In the embodiment illustrated, the forward mating flange 206 and the forward section flange 106 are threaded to a standard ACME specification (7.50-8 2G ACME). This feature can be used to rotate the tool-less joiner clamp 200 in a fashion that draws the forward section 102 onto the tool-less joiner clamp 200 and towards the aft section 104. In some embodiments, the tool-less joiner clamp 200 and/or other components may include a seal configured to provide an airtight/watertight seal between the aft section 104 and the forward section 102. In some embodiments, the seal is maintained by a series of rubber rings 112 on the outer diameter of the aft section flange 108 being configured to integrate with an inner diameter of the forward section flange 106 when the two sections are joined together (see FIG. 3B).

An increase in pressure internal to the cavity 212 (see FIG. 7) results when said airtight/watertight seal is formed and when the tool-less joiner clamp 200 is rotated to bring the aft section 104 and the forward section 102 together. In particular, as the tool-less joiner clamp 200 is rotated, the aft section 104 and the forward section 102 are brought closer to each other, thus decreasing the volume of the internal cavity 212, which causes an increase in pressure internal to the cavity 212 as air in the cavity is compressed. In particular, this will cause the air pressure internal to the cavity to be greater than the atmospheric air pressure external to the cavity 212.

This increase in pressure can be used to disconnect the connected sections of the vehicle 100 when desired by providing separating force. In particular, when it is desirable to separate the aft section 104 from the forward section 102, the tool-less joiner clamp 200 can be released, as described in more detail in conjunction with the description of FIG. 5. If the pressure inside of the cavity 212 remain greater than the external atmospheric pressure, then the aft section 104 and forward section 102 will be forced apart by the higher-pressure forces internal to the cavity 212.

Figure 7:
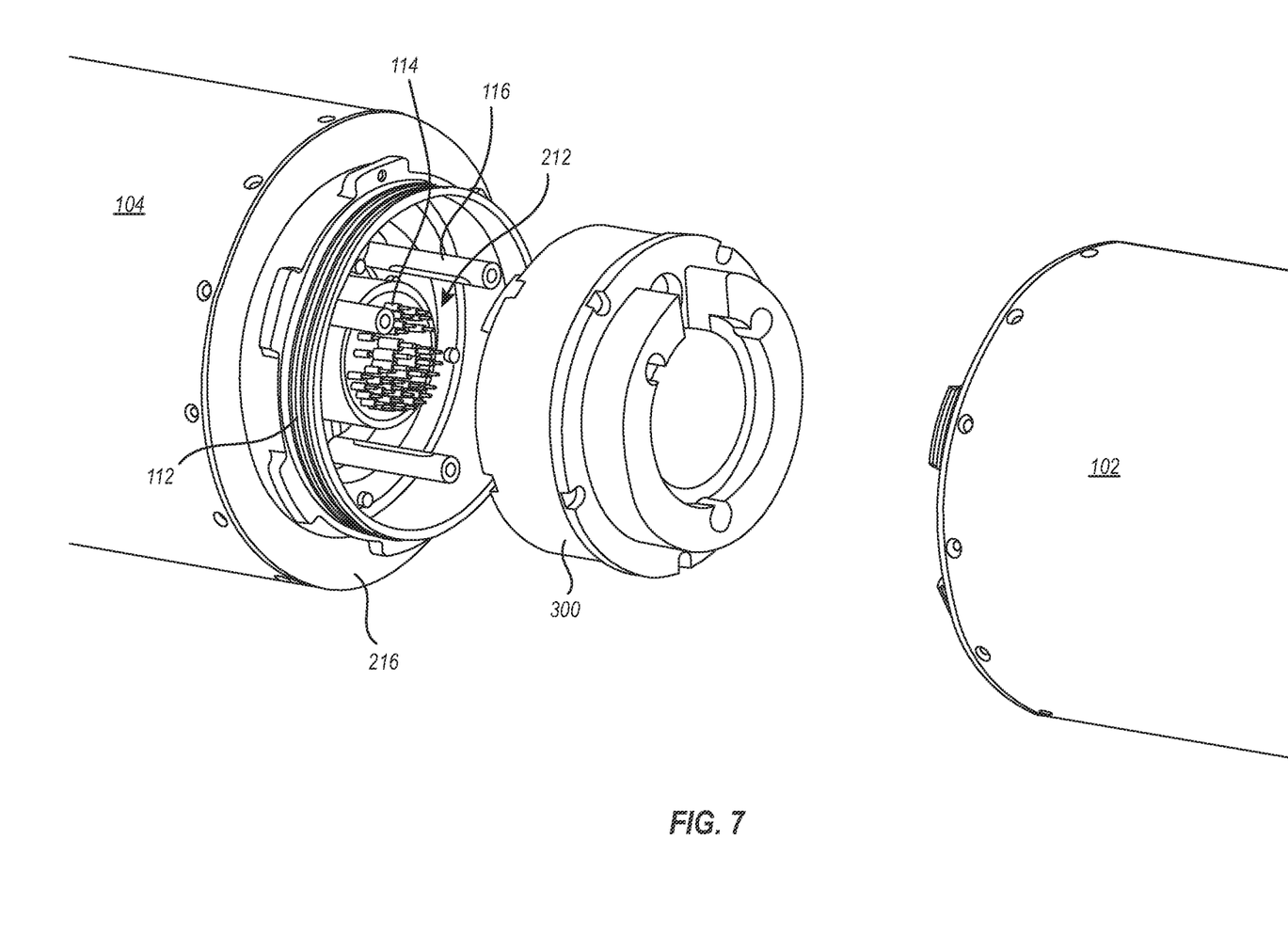
FIG. 7 illustrates a perspective view of an exemplary foam insert in association with two corresponding sections of a UUV.

FIG. 7 illustrates that the aft section 104 and forward section 102 may each have internally sealed portions that contain components such as payloads, battery packs, or other items. Often, these sections are vacuumed, and the nitrogen backfilled. However, the aft section 104 and forward section 102 have mating electrical connectors (e.g., connectors 114) that extend in the cavity 212 (external to the sealed portions of the sections) for electrically connecting the two sections. Thus, in some embodiments, it is important that the aft section 104 and forward section 102 be properly aligned to allow appropriate mating connector to connect to each other. As such, some embodiments may include posts (such as post 116) or other guides to allow the aft section 104 and forward section 102 to be properly aligned.

Note that as discussed above, the aft section flange 108 and aft mating flange 208 are not threaded, while the forward section flange 106 and forward mating flange 206 are threaded. This allows for maintaining proper alignment of connectors and other components while allowing the aft and forward sections 104 and 102 respectively to be drawn toward each other as described above.

In some embodiments, an additional foam component 300 (see FIG. 7) is placed within the cavity 212 to reduce the amount of space available for air to compress as the forward and aft sections are brought together, thereby increasing the pressure and corresponding magnitude of pressurized force available to aid in disconnecting the two sections when desired. In some embodiments, the foam component 300 is constructed of a syntactic foam comprised of hollow glass balls and urethane. Note that the foam component 300 may also provide the advantage of increased buoyancy should a leak develop in the cavity 212 during operation of the vehicle 100. Alternatively, the foam component 300 may be constructed of a closed cell foam or any other material that reasonably meets the design goals of buoyancy, weight reduction, and increased pressure within the cavity 212. Alternatively, a component of a different material may be used as ballast. That is, a component that is denser than water, or at least denser than foam or other materials, may be used to add weight to the vehicle 100 to select an appropriate buoyancy for the vehicle.

As illustrated in FIG. 7, the foam component 300 may include various opening and configurations for various purposes. For example, the openings may be used to align the foam component and/or to allow for the aft section 104 and the forward section 102 to be properly aligned. Alternatively or additionally, the openings and configurations may be used to control the internal pressure in the cavity 212 to a particular pre-determined pressure. In particular, by controlling the amount of free air in the cavity 212 by controlled displacement of other air using the foam component 300, pressure inside the cavity 212 may be roughly or precisely controlled.

Figure 3A:
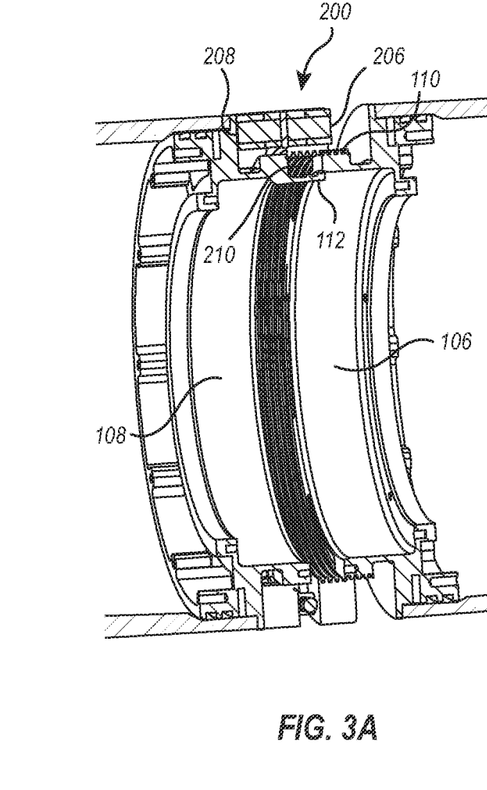
FIG. 3A illustrates a cross-sectional view of an exemplary tool-less joiner clamp being attached to two corresponding sections of a UUV.

Returning to the process of joining the aft section 104 and the forward section 102, the tool-less joiner clamp 200 can be opened and placed in series with the two sections such that the clamp and the sections are aligned as illustrated in FIG. 3A. As shown in FIG. 3A, to begin the joining process in some embodiments, the aft mating flange 208 is attached to the aft section flange 108 and the threads 210 of the forward mating flange 206 are integrated with the threads 110 of the forward section flange 106.

Figure 3B:
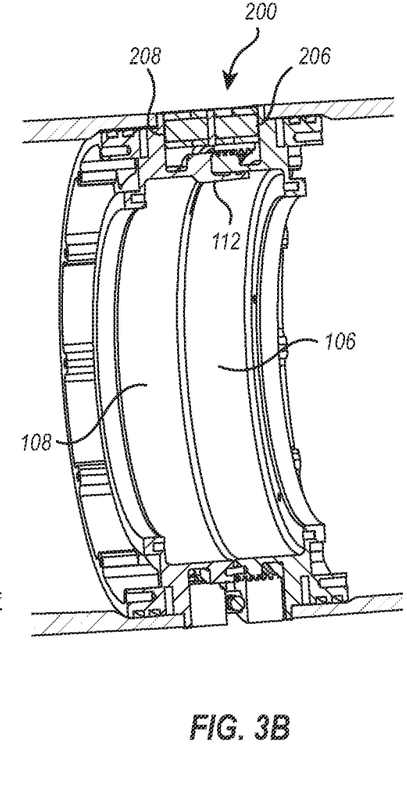
FIG. 3B illustrates a cross-sectional view of the exemplary tool-less joiner clamp of FIG. 3A after the clamp has been rotated to bring the two corresponding UUV sections together.

As illustrated in FIG. 3B, once the tool-less joiner clamp 200 has been connected to the two sections 102, 104, the clamp 200 can be rotated about the threads 110, 210 to pull the two sections together. In the illustrated embodiment, a seal is formed when the two sections 102, 104 are pulled together by means of a set of rubber rings or gaskets 112 attached to an outer diameter of the aft section flange 108 that is configured to mate with an inner diameter of the forward section flange 106. As described in detail above, pulling the two sections 102, 104 together by turning the clamp 200 results in an increase in pressure within the cavity 212 (see FIG. 2) between the two joined sections 102, 104.

Figure 3C:
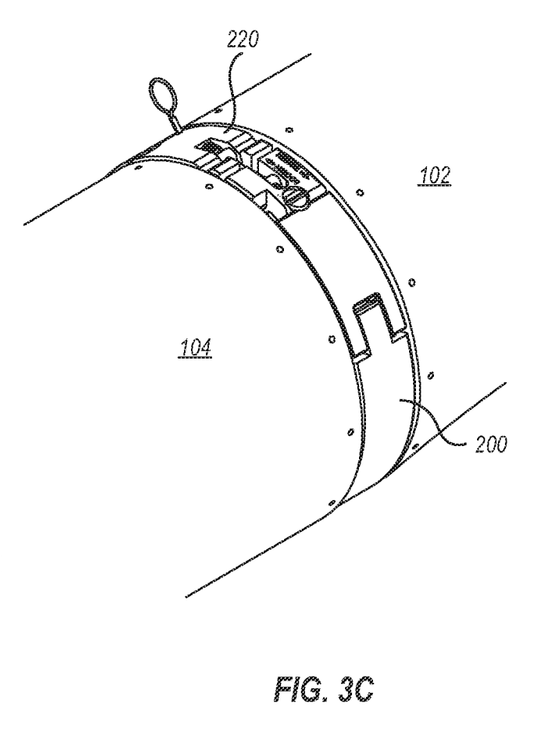
FIG. 3C illustrates a perspective view of the exemplary tool-less joiner clamp of FIGS. 3A and 3B after the cam clamp mechanism has been tightened and secured.

As shown in FIG. 3C, the illustrated embodiment further comprises a cam clamp 220 (see FIG. 5 for additional detail) for tightening the seal between the two sections 102, 104 by increasing the friction asserted by the tool-less joiner clamp 200. Once the process is completed, a seal between the forward section 102 and the aft section 104 of the vehicle 100 is formed and the vehicle 100 may be deployed for operations.

Figure 4:
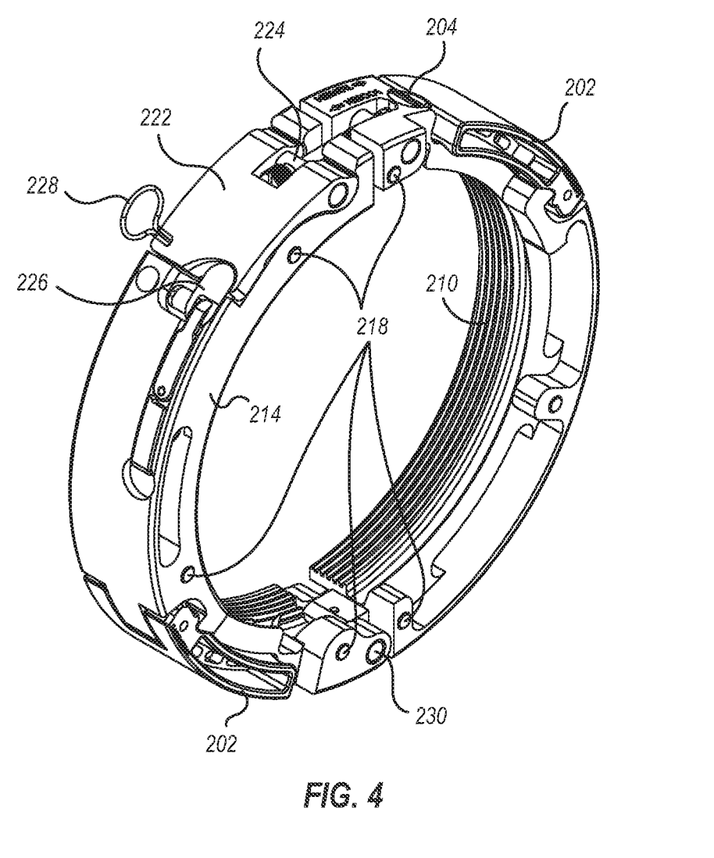
FIG. 4 illustrates a detailed perspective view of an exemplary tool-less joiner clamp.

Referring now to FIG. 4, an exemplary tool-less joiner clamp 200 is shown in greater detail. In the illustrated embodiment, the main body of the clamp 200 comprises two semi-circular components joined by a hinge pin 230 in order to allow for the clamp 200 to be opened, closed, and tightened as explained herein. An opposite end of the two semi-circular components are joined by a cam clamp mechanism 220 (see FIG. 5). The cam clamp 220 comprises a cam lock mechanism 224, a clamp lever 222, a wire rope 228, and a quick release mechanism 226. These components are described in further detail below in relation to FIG. 5.

Further FIG. 4 shows that at least one embodiment of the tool-less joiner clamp 200 can also comprise one or more rotation handles 202 configured to provide a user with means for rotating the joiner clamp 200 about the forward section flange 106, as described above in relation to FIGS. 3A through 3C. The handles 202 can include spring-loaded hinges such that they easily open when needed. As shown, a coin lock 204 holds each handle 202 in a closed position when not in use.

The tool-less joiner clamp may include additional functionality. For example, some embodiments of the tool-less joiner clamp include a jacking functionality for forcing the two joined sections apart when there is insufficient internal pressure (as described above) to force the two sections apart, or for other reasons. In particular, the clamp may be rotated in the opposite direction of the joining operation to push the two sections apart. In at least one embodiment, the tool-less joining clamp 200 includes a flat surface 214 configured to push against a corresponding flat surface 216 (see FIG. 7) of the aft section 104. To prevent the jacking operation from marring the flat surface 216, the tool-less joiner clamp 200 may include a plurality of polymer buttons 218 which contact the flat surface 216 to push against it during the jacking operation. In some embodiments, the buttons 218 are constructed of polyoxymethylene, such as polymers sold under the trade name DELRIN and available from DUPONT Corporation. These polymers are particularly well suited for this purpose due to their hard, but non-marring characteristics.

Figure 5:
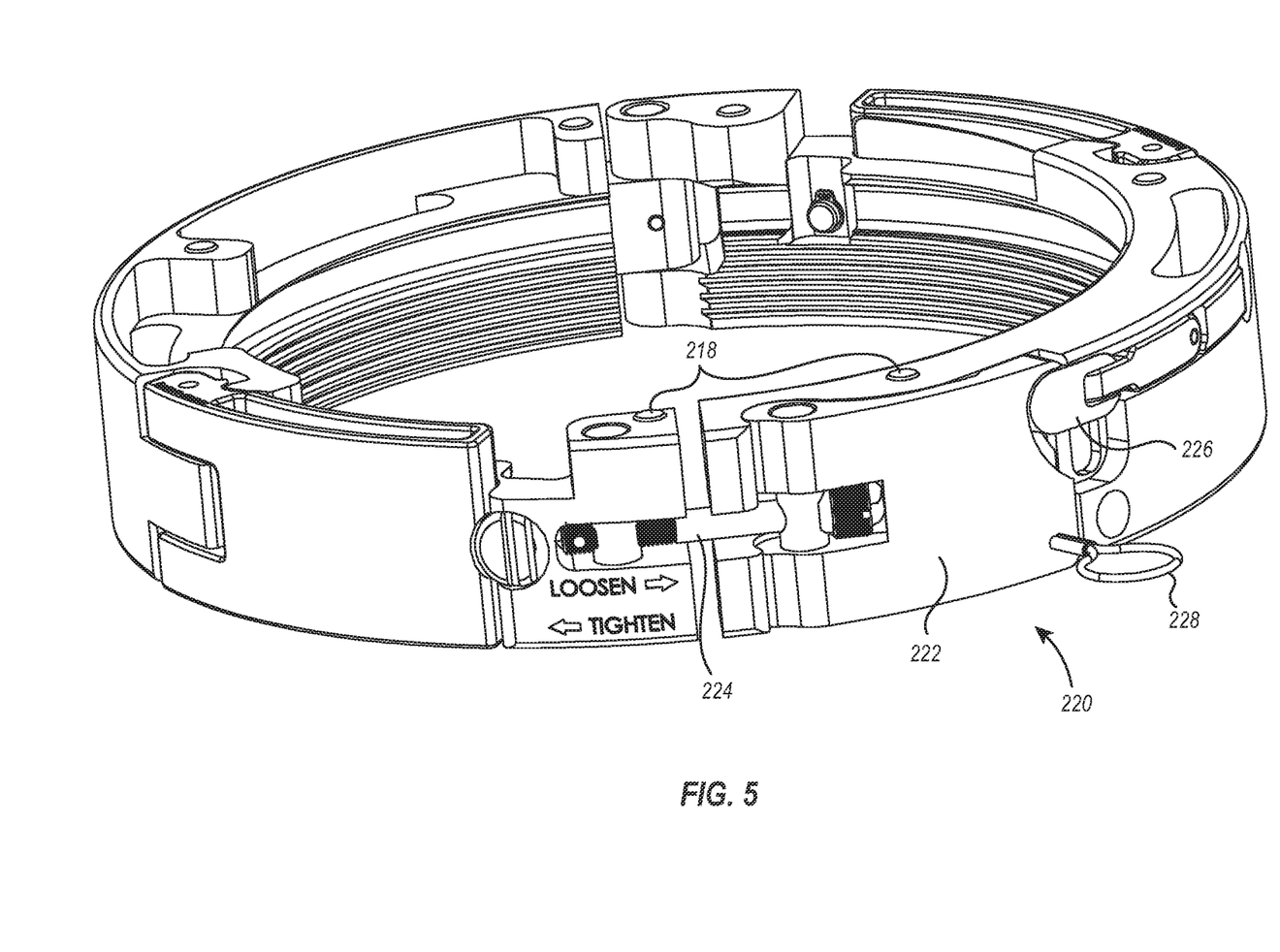
FIG. 5 illustrates a closeup perspective view of an exemplary cam clamp mechanism on a tool-less joiner clamp.

FIG. 5 provides a closeup view of an exemplary cam clamp 220 configured to increase the friction of the tool-less joiner clamp 200 and thus complete the joining process. As illustrated, the cam clamp 220 comprises a cam lock mechanism 224 configured to adjustably tighten or loosen the closure of the clamp 200. A clamp lever 222 is attached to the cam lock mechanism 224 and configured to clamp the mechanism into a locked position. A quick release mechanism 226 is included to hold the clamp lever 222 in a closed position until the release mechanism 226 is operated to release the clamp lever 222. A wire rope 228 is also included to provide the user with means for opening the clamp lever 222 should the friction thereon be too tight for the lever to release on its own. As described above, when there is sufficient pressurization within the cavity 212, the tool-less joiner clamp 200 may be released by opening the cam clamp 220 and allowing the pressure to separate the two vehicle sections 102, 104.

Figure 6:
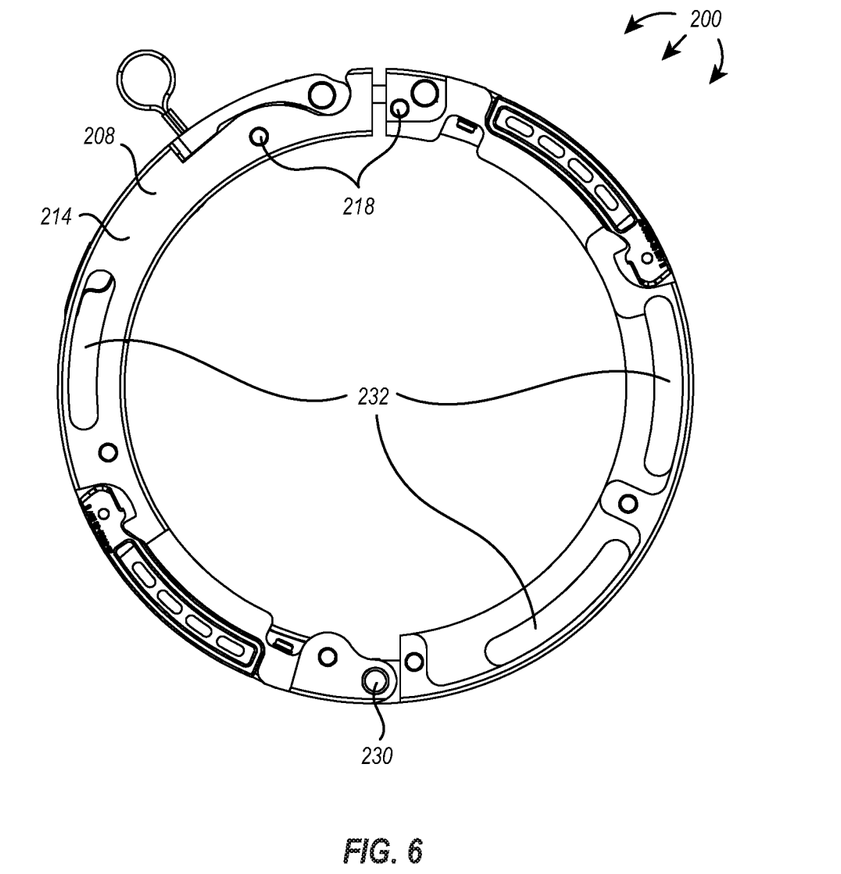
FIG. 6 illustrates a planar view of the exemplary tool-less joiner clamp of FIG. 4 looking at the aft mating flange towards the forward mating flange.

FIG. 6 illustrates a planar view of the exemplary tool-less joiner clamp of FIG. 4, looking at the flat surface 214 of the aft mating flange 208 towards the forward mating flange 206 (see FIGS. 3A-3C). In some embodiments, the tool-less joiner clamp and/or components thereof are at least partially constructed of titanium. Advantages of titanium include weight reduction and resistance to corrosion.

As illustrated, additional weight reduction can be achieved in some embodiments by removing unnecessary material from the body of the tool-less joiner clamp 200. As illustrated in FIG. 6, for example, multiple recesses 232 have been formed by removing material from the body of the tool-less joiner clamp.

Alternatively or additionally, material may be removed from the mating flanges 206, 208 of the tool-less joiner clamp 200. For example, the forward and aft mating flanges 206, 208 may include open portions that are devoid of material, as well as solid portions. The open portions and solid portions of each flange 206, 208 are intermittently spaced around the joiner clamp 200. Note that the intermittent spacing of the open portions and solid portions may require certain design choices to be made with respect to the aft section flange 108 in order to prevent the clamp 200 from disengaging with the aft section 104 of the vehicle 100.

For example, the aft section flange 108 should be of a size and shape to prevent the occurrence of an orientation in which the clamp 200 would disengage from the flange 206 as a result of the open portions of the aft mating flange 204 lining up with the protruding portions of the aft section flange 108. This can be achieved in a number of different ways. In some embodiments, for example, open portions of the aft mating flange 204 are smaller than the solid portions of the corresponding aft section flange 108. Alternatively, open portions of the aft section flange 108 can be smaller than the solid portions of the aft mating flange 204. Alternatively or additionally, different sizes and/or patterns of solid portions and open portions can be utilized to prevent the joiner clamp 200 from disengaging with the aft section flange 108. Similar conditions and configurations can be employed with respect to the forward mating flange 206 and the forward section flange 106.

FIG. 7 shows an exemplary foam component 300 as described above in relation to FIG. 2. As illustrated, a foam component 300 can be inserted into cavity 212 prior to joining vehicle sections 102, 104 with a tool-joiner clamp 200. By occupying a portion of the otherwise empty space of the cavity 212, the foam component 300 operates to increase the total pressure within the cavity 212 when the two sections 102, 104 are sealed and pulled together in accordance with the procedure described herein. Also, the foam component can provide additional buoyancy to the vehicle 100. In some embodiments, the foam component 300 is constructed of a syntactic foam comprised of hollow glass balls and urethane. Note that the foam component 300 may be constructed of other materials to meet the same design goals, such as a closed cell foam, for example.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A joiner clamp for joining two sections of an underwater vehicle, the joiner clamp comprising:
   a clamp body comprising:
      two semi-circular components, each having a first end and a second end and being attached to one another at corresponding first ends with a hinge pin;
      a first mating flange configured to attach to a first section flange of the underwater vehicle; and
      a second mating flange having a threaded inner diameter configured to integrate with a threaded outer diameter of a second section flange of the underwater vehicle, such that rotating the joiner clamp about the second section flange operates to move the joiner clamp towards the second section flange in an axial direction; and
   a cam lock configured to selectively secure the corresponding second ends of the two semi-circular components of the clamp body, the cam lock comprising an adjustable locking mechanism, a cam lever configured to selectively close the locking mechanism, and a quick release lever configured to release the cam lever when actuated.

2. The joiner clamp for joining two sections of an underwater vehicle of claim 1, further comprising a plurality of buttons configured to press against a flat surface on the first section flange when the joiner clamp is rotated about the second section flange.

3. The joiner clamp for joining two sections of an underwater vehicle of claim 1, further comprising one or more handles, each having an open position and a closed position, such that each of the one or more handles is flush with an outer diameter of the joiner clip when in the closed position.

4. The joiner clamp for joining two sections of an underwater vehicle of claim 1, wherein the first mating flange is an aft mating flange and the first section flange is an aft section flange.

5. The joiner clamp for joining two sections of an underwater vehicle of claim 1, wherein the second mating flange is a forward mating flange and the second section flange is a forward section flange.

6. The joiner clamp for joining two sections of an underwater vehicle of claim 1, wherein at least one of the first mating flange, second mating flange, first section flange or second section flange comprises open and solid portions intermittently spaced.

7. The joiner clamp for joining two sections of an underwater vehicle of claim 1, wherein the joiner clamp is configured to facilitate creating a watertight seal between the two sections of the underwater vehicle.

8. The joiner clamp for joining two sections of an underwater vehicle of claim 1, wherein the joiner clamp is configured to facilitate increasing pressure internal to a cavity between the two sections of the underwater vehicle.

9. A system for joining two sections of an underwater vehicle, the system comprising:
   a joiner clamp, comprising:
      a circular body formed by two semi-circular parts that are joined by a hinge, the hinge being operable to open the joiner clamp;
      a first mating flange and a second mating flange, the second mating flange having a threaded inner diameter; and
      a cam lock configured to selectively secure the joiner clamp in a closed position, wherein the cam lock further comprises a quick release mechanism configured to open the cam lock when actuated;
   a first section flange configured to selectively attach to the first mating flange of the joiner clamp; and
   a second section flange having a threaded outer diameter configured to integrate with the threaded inner diameter of the second mating flange of the joiner clamp, such that rotating the joiner clamp about the second section flange operates to move the joiner clamp towards the second section flange in an axial direction.

10. The system of claim 9, further comprising a foam component configured to be inserted within a cavity defined by the inner diameters of the joiner clamp, the first section flange, and the second section flange.

11. The system of claim 9, wherein the joiner clamp further comprises one or more handles, each having an open position and a closed position, such that each of the one or more handles is flush with an outer diameter of the joiner clip when in the closed position.

12. The system of claim 9, wherein the joiner clamp further comprises a plurality of buttons configured to press against a flat surface on the first section flange when the joiner clamp is rotated about the second section flange.

13. The system of claim 12, wherein the buttons comprise polyoxymethylene.

14. The system of claim 9, wherein the first section flange further comprises an outer diameter having one or more rubber gaskets configured to form a waterproof seal when the outer diameter of the second section flange is integrated with an inner diameter of the second section flange.

15. The system of claim 9, wherein at least one of the first mating flange, second mating flange, first section flange or second section flange comprises open and solid portions intermittently spaced.

16. A method of joining a first section and a second section of an underwater vehicle, the method comprising:
   selectively attaching a joiner clamp to a first section flange on the first section and a second section flange on a second section, by closing a circular body of the joiner clamp formed by two semi-circular parts that are joined by a hinge, the hinge being operable to open the joiner clamp, such that the first section flange engages with a first mating flange on the joiner clamp and the second section flange mates with a second mating flange on the joiner clamp, the second mating flange having a threaded inner diameter, and the second section flange having a threaded outer diameter configured to integrate with the threaded inner diameter of the second mating flange of the joiner clamp; and rotating the joiner clamp about the second section flange, in a first direction, to move the joiner clamp towards the second section flange in an axial direction.

17. The method of claim 16, further comprising inserting a foam component within a cavity defined by the inner diameters of the joiner clamp, the first section flange, and the second section flange.

18. The method of claim 16 further comprising separating the first section and the second section by releasing a quick connect release on the joiner clamp and allowing the first section and second section to be forced apart by an increased pressure, as compared to an external pressure external to the underwater vehicle, internal to a cavity defined by the inner diameters of the joiner clamp, the first section flange, and the second section flange, caused by rotating the joiner clamp about the second section flange, in a first direction, to move the joiner clamp towards the second section flange in an axial direction.

19. The method of claim 16 further comprising separating the first section and the second section by causing the first mating flange to press against a flat surface on the first section flange when the joiner clamp is rotated about the second section flange in a second direction, opposite the first direction.

* * * * *